United States Patent [19]

Grantham

[11] 4,203,814
[45] May 20, 1980

[54] HYDROGEN GAS GENERATION UTILIZING A BROMIDE ELECTROLYTE AND RADIANT ENERGY

[75] Inventor: Daniel H. Grantham, Glastonbury, Conn.

[73] Assignee: United Technologies Corporation, Hartford, Conn.

[21] Appl. No.: 956,760

[22] Filed: Nov. 1, 1978

[51] Int. Cl.² .................. C25B 1/02; C25B 1/00
[52] U.S. Cl. ............................ 204/129; 204/128; 204/DIG. 3; 429/111
[58] Field of Search ............... 204/128, 129, DIG. 3; 429/111

[56] References Cited

U.S. PATENT DOCUMENTS

| | | | |
|---|---|---|---|
| 394,638 | 12/1888 | Brevoort et al. | 429/106 |
| 807,640 | 12/1905 | Roberts | 423/487 |
| 3,756,930 | 9/1973 | Weiss et al. | 204/129 |
| 3,954,577 | 5/1976 | Levine | 204/59 R |
| 4,011,149 | 3/1977 | Nozik | 204/129 |
| 4,021,323 | 5/1977 | Kilby et al. | 204/129 |
| 4,042,758 | 8/1977 | Weinstein et al. | 429/111 |
| 4,069,120 | 1/1978 | Meyerand, Jr. et al. | 204/129 |
| 4,128,701 | 12/1978 | Maricle | 429/21 |
| 4,129,683 | 12/1978 | Maricle | 429/21 |
| 4,137,136 | 1/1979 | Ueda et al. | 204/98 |
| 4,147,600 | 4/1979 | Rutherford et al. | 204/98 |

OTHER PUBLICATIONS

W. Glass et al., "Performance of Hydrogen–Bromine Fuel Cells," Advances in Chemistry Series, vol. 47 (Am. Chem. Soc.) (1965) pp. 203–219.

S. N. Frank et al., "Semiconductor Electrodes. 12. Photoassisted Oxidations & Photoelectrosynthesis at Polycrystalline $TiO_2$ Electrodes", *J. Am. Chem. Soc.*, vol. 99, pp. 4667–4675 (1977).

*Primary Examiner*—Aaron Weisstuch
*Attorney, Agent, or Firm*—Harry J. Gwinnell

[57] ABSTRACT

Radiant energy to at least partially power an electrolytic cell is used in the generation of hydrogen, utilizing a bromide, preferably hydrogen bromide, as the essential electrolyte component in the electrolytic cell to solve overvoltage and corrosion problems associated with the use of conventional electrolytes in similar environments. The use of such material also results in a broadening of the selection of semiconductor electrodes which can be used in such process and apparatus. The semiconductors employed are generally nonmetals and can be multilayered structures comprised of a gradient of diminishing width band gap material. The hydrogen generated from such system can be used to power a fuel cell.

12 Claims, 3 Drawing Figures

HYDROGEN GAS GENERATION UTILIZING A BROMIDE ELECTROLYTE AND RADIANT ENERGY

CROSS-REFERENCE TO RELATED APPLICATIONS

Reference is made to application Ser. No. 956,761 filed by the same inventor, having the same assignee, of even filing date herewith entitled "Method and Apparatus for Producing HBr Utilizing a Consumable Bromine Electrode" which demonstrates a method and apparatus useful for generating hydrogen bromide which can be used as an electrolyte in the instant invention.

BACKGROUND OF THE INVENTION

1. Field of the Invention

The field of art to which the invention pertains is electrolytic processes for producing hydrogen gas.

2. Description of the Prior Art

The use of solar energy to power electrolytic cells has received widespread attention in view of recent energy resource depletion and environmental pollution awareness. The production of hydrogen from electrolytic cells and the use of solar energy to power such cells has been recognized by the prior art as a marriage of two arts which has great potential in the solution of both these problems. While much work has been done on improving the efficiency of such systems, more work is needed in view of the low energy levels involved in extracting useful energy from the sun (i.e. low extractable voltages from sunlight per square foot of collection apparatus) and in view of the overvoltage and corrosion problems associated with the use of conventional electrolytes in this environment. The range of semiconductor material useful to gather this potentially great source of energy in this environment has also been limited because of the corrosive effects of conventional electrolytes on such semiconductors.

What is needed is an electrolyte system useful in basically conventional electrolytic cells which are at least partially radiant energy powered and which will produce hydrogen to power a fuel cell while solving the inefficient overpotential and corrosion problems associated with the use of conventional electrolyte systems. What is also needed is a system which will expand the use of available semiconductor material which can be used in such systems to provide more flexibility in establishing photoelectrolytic processes with greater efficiency.

BRIEF SUMMARY OF THE INVENTION

In accordance with the present invention, electrolytic processes for producing hydrogen gas useful to power a fuel cell have been invented which utilize bromides, and especially hydrogen bromide, as the essential electrolyte, thereby solving the overpotential and corrosion problems associated with the use of conventional electrolytes in this environment and also broadening the range of useful semiconductors which are available in this environment to maximize the efficiency of such photoelectrolytic processes.

The foregoing and other objects, features and advantages of the present invention will become more apparent in light of the following detailed description of preferred embodiments thereof as discussed and illustrated in the accompanying drawings.

DESCRIPTION OF PREFERRED EMBODIMENTS

Figure 1:
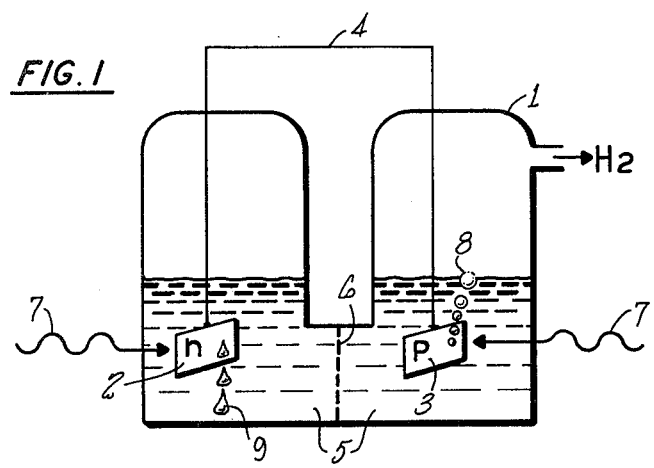
FIG. 1 describes a typical cell arrangement utilizing a standard photoelectrolytic cell.

As described above, much work has been done in combining solar energy with that body of electrolysis art which produces hydrogen for running, for example, a fuel cell, the marriage of the two arts providing a great source of electrical energy with limitless potential. However, such combination has been difficult because of the small amounts of energy which can be extracted from the sun without cumbersome equipment and the corrosion, overpotential, and other problems associated with the use of conventional electrolytes. The use of bromide compounds, and especially hydrogen bromide, as electrolytes in such a cell environment provides surprising advantages. The lower potentials at which a hydrogen bromide cell can be run, for example, compared to the higher cell potentials necessary for the dissociation of water or chloride compounds, both increases the life of the components of the cell and makes available a broader range of semiconductor material than is presently usable in such cells. Furthermore, the dissociation products from other halogen electrolytes such as hydrogen iodide or hydrogen fluoride, exist as solids or much more corrosive gases under normal conditions of atmosphere and pressure. This presents a myriad of problems of precipitation and special handling in both the electrolytic cell and the fuel cell. And a hydrogen bromide electrolyte provides more energy storage per pound than, for example, hydrogen iodide in an electrolytic cell environment.

While the present invention has been described in terms of producing hydrogen for use in a fuel cell, the bromine produced also has fuel cell utility. Note in this regard, an article by Glass et al, "Performance of Hydrogen-Bromine Fuel Cells", Advances In Chemistry Series, vol. 47, 1964, A.C.S. Applied Publications, which describes the various advantages of such a system.

The bromide cell of the present invention can also be run at reduced pressures and concentrations such that the photoelectrolytic cell can be used with voltages equivalent to the use of such things as hydrogen iodide but with the advantages of dealing with the liquid bromine produced, thus eliminating the problems associated with a product which exists as a solid such as iodine under normal solution conditions. Also, the large optical absorption coefficients of even dilute solutions of other halogen dissociation products such as iodine would have a severely adverse effect on the efficiency of a system which utilizes radiant energy such as light as a power source as in the disclosed invention.

Another advantage of the bromide electrolyte system is that conventional electrolytic cells for the dissociation of water can be readily adapted to a bromide electrolyte system with little or no modification. Chloride or fluoride electrolyte systems, for example, which are more corrosive than even conventional water dissociation systems and solid iodine dissociation products would all clearly require greater modification. There are also very definite advantages of the bromide system in the elimination of the overvoltages associated with chloride and especially water dissociation products. Note the Glass et al article mentioned supra at page 204 and U.S. Pat. No. 4,021,323 at column 7.

While solar energy is the preferred source of radiation in the process and apparatus of the invention, other radiant energy sources can be used such as laser radiation or light emitting solid stage diodes, the only requirement being that the radiant energy be of proper wavelength and sufficient intensity to evolve hydrogen gas in the particular cell being irradiated. The proper wavelength required relates to the particular semiconductor being used. The wavelength must be short enough to at least match the characteristic of the particular semiconductor used. The semiconductor will not absorb radiant wavelengths longer than its band gap radiation characteristic. In fact, one of the advantages of the invention is the elimination of the corrosion and oxidation problems of conventional electrolytes which attack many semiconductor materials, thus enabling a broader range of semiconductor material to be used. With a broader range of semiconducting material thus available, a broader range of light wavelength can be used to more efficiently power the system. Also, while it is preferred to run the electrolysis solely powered by radiant energy, such as light, great advantage can be obtained by combining the light powered system with an external power source such as a battery. This is of particular value in instances where the semiconductor-radiation combination produces insufficient photovoltage to meet the threshold voltage required to run the cell. Note the Nernst equation, infra. For example, for a 48% solution of HBr 0.6 volt would be required to run the cell, thus any semiconductor-radiation combination producing less than that voltage with such solution would require an external power source. Even with sufficient voltage supplied by the radiation source the external power source could also be used to increase the rate of hydrogen gas evolution, although at a cost in efficiency of the system. In any case, the amount of voltage supplied from this external power source must be less than that required to electrolyze the bromide compound in the absence of the light irradiated semiconductor electrode in order to have an energy efficient system. In such a situation, the power recovered from the recombination of, for example, hydrogen and bromine in a fuel cell would be approximately equal to the sum of the solar input power and external voltage supplied.

Any conventional semiconductor material having photoelectric properties is useful in the invention, such as silicon or titanium dioxide. This represents a broadened class of semiconductors since semiconductors such as silicon are not typically useful in conventional systems of the prior art because of the adverse effects of the conventional electrolytes on such semiconductor material at the greater than 1.25 volt cell potentials such cells are conventionally run at. For example, conventional hydrogen gas generating electrolysis systems such as those run by water dissociation would not permit the use of silicon semiconductors because of the corrosive effects of the free oxygen also produced on such semiconductor. Because of the overpotential required to run such a cell, the corrosive effects of the oxygen in such an environment would be prohibitive. However, in the herein described system because of the lack of an overvoltage problem with the use of bromides such as HBr and the noncorrosive effects of the bromine produced on a silicon semiconductor in such an environment a silicon semiconductor can be used. Therefore, because silicon semiconductors work effectively to convert radiant energy to electrical energy at wavelengths up to 11,000 Å, a greater, more efficient light gathering source can be used in the disclosed system. If one were limited, for example, to $TiO_2$ semiconductors which would otherwise be required because of their more corrosion resistant properties, only those wavelengths of light below about 4,000 Å would be useful. This would effectively exclude about 97% of the solar spectrum.

Multilayered semiconductor material comprised of a gradient of diminishing width band gap material is also available to the invention process in view of the advantages encompassed in the use of the bromide electrolyte. Note, for example, U.S. Pat. No. 4,011,149 at col. 2, lines 18–20 in this regard.

The Nernst equation which governs the cell potential relationship required for electrolysis in this process can be described as follows:

$$E = E° + 0.059 \log P_{H2} + 0.059 \log C_{Br2} - 0.059 \log C_{HBr}$$

wherein
- $E°$ = standard cell potential for cell components (e.g. for HBr electrolysis 1.06 volt),
- $P_{H2}$ = partial pressure of hydrogen produced in the cell,
- $C_{Br2}$ = molar concentration of bromine liquid produced in the cell.
- $C_{HBr}$ = molar concentration of hydrogen bromide or other bromide in the cell.
- E = the threshold voltage or cell potential to be overcome by the photovoltage. This is the voltage at which current begins to flow in the cell and significant amounts of hydrogen and bromine begin to evolve.

The preferred parameters for efficient operation of the cell of the present invention are:

$P_{H2} > 0.05$ psi
$C_{Br2} > 0.1\%$
$C_{HBr} < 48\%$

A cell with such parameters can be efficiently run at temperatures between about 0° and 100° C. Percents as recited throughout the disclosure are percents by weight.

The particular bromide electrolyte system of the invention and the advantages inherent in its use because of the cell potential, lack of oxidation-corrosion problems, and elimination of overpotential problems of conventional cells allow many different cell arrangements to be used in the performance of the invention. One arrangement can comprise a standard cell arrangement with the entire cell subject to radiation from a light source. Other arrangements can comprise cells with one metal electrode and one semiconductor electrode where the semiconductor can be irradiated either from the solution side or dry side of the cell.

As stated above, the key component in the electrolytic solution is the bromide compound present in the solution in amounts up to about 50% by weight, with a concentration of about 48% by weight preferred. This provides the hydrogen (and bromine if desired) to run the ultimate fuel cell which the photoelectrolytic cell is intended to produce. While water is the preferred solvent for the electrolyte and hydrogen bromide the preferred electrolyte the system is readily adaptable to other solvents and bromide containing electrolytes. For example, alcohols or amines may be used as solvents for the system and such bromide electrolytes as KBr, NaBr, LiBr, CsBr and SrBr$_2$ may be used either individually, as mixtures or admixtures with the HBr. If alcohol or amine solvents are employed it is preferred to add at least small amounts of water to the system especially if a bromide other than HBr is used as the bromide electrolyte. The concentration of the hydrogen bromide may be any concentration up to the saturation point of the solution, provided the cell potential does not reach the corrosion potential for the semiconductor being used. The system may also be run at any operable pressure with up to 1 atmosphere being preferred.

As mentioned above, the source of energy to run the cell can be any radiant energy source with wavelengths shorter than the band gap radiation characteristic of the semiconductor used. For example, for a silicon semiconductor any light source with wavelengths less than 11,000 Å could run the system. Also, as mentioned above, one of the advantages of the hydrogen bromide system is the broadened range of semiconductor material available by using the bromide electrolyte, and the cell potentials and lack of corrosion resulting from such use. Nonmetallic materials having photoelectric properties can be used and specifically titanium dioxide and silicon can be used, with silicon being the preferred semiconducting material. Also useful in this invention is an alternative form of electrode comprising multilayered structures of a gradient of diminishing width band gap material.

Reference is now made to the various figures for details of the cell configuration. In FIG. 1 a conventional electrolytic cell housing 1 comprising an n-type semiconducting anode 2 and a p-type semiconducting cathode 3 are connected through external circuit 4. The electrolyte solution 5 is a 48% solution of hydrogen bromide and water separated by a hydrogen ion permeable membrane 6 such as Nafion ® (E. I. Dupont de Nemours and Co.), thin quartz, polyvinyl chloride, or polytetrafluoroethylene, which allow free hydrogen ion transport in the system. Upon activation with light or other radiant energy 7 current is conducted through the external circuit 4 upon dissociation of the hydrogen bromide resulting in the production of hydrogen gas 8 in the p-electrode chamber and liquid bromine 9 in the n-electrode chamber.

Figure 2:
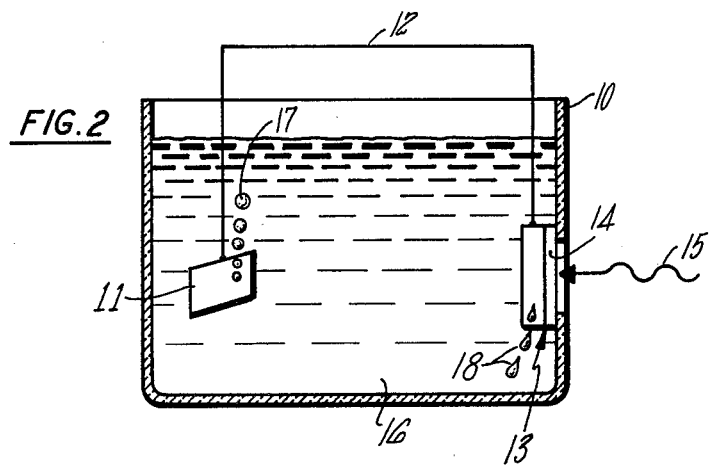
FIG. 2 describes a second arrangement where the radiant energy source activates from the dry side of the cell.

In FIG. 2, a dry side irradiation cell arrangement is depicted wherein the cell housing 10 contains a metal electrode 11, such as platinum or titanium, connected by external circuit 12 to the semiconductor electrode 13 containing a tin oxide outer layer 14. When light or other radiant energy 15 impinges on semiconductor 13, the hydrogen bromide electrolyte solution 16 dissociates causing the migration of the hydrogen ions to the platinum or titanium electrode 11 and bromide ions to semiconductor electrode 13 resulting in the evolution of hydrogen gas 17 at electrode 11 and liquid bromine 18 at electrode 13.

Figure 3:
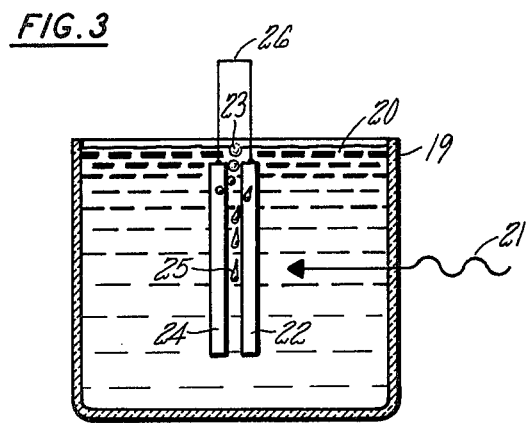
FIG. 3 describes another arrangement where the radiant energy source activates from the solution side of the cell.

FIG. 3 demonstrates another solution side radiation apparatus. Housing 19 encloses the hydrogen bromide and water electrolyte solution 20 which is subjected to light or other radiation 21. When the radiation impinges semiconductor surface 22 charge transfer across the electrolyte-semiconductor interface takes place discharging one of the ions in the solution and hydrogen gas 23 is evolved at the platinum electrode 24 and liquid bromine 25 at electrode 22. The transfer of charge across the electrolyte-semiconductor interface results in an imbalance of charge in the semiconductor and a driving voltage for current flow through an external circuit 26 to electrode 24 immersed in the electrolyte.

EXAMPLE I

A 48% by weight solution of hydrogen bromide in water was placed in an electrolytic cell comprised of an n-type silicon anode and a platinum cathode of the type described in FIG. 1. The silicon electrode was irradiated with a 6328 Å wavelength light source, providing about 0.2 volt. A supplemental external power source provided about 0.4 volt. Bromine liquid was evolved from the silicon electrode and hydrogen gas from the platinum electrode.

EXAMPLE II

The platinum cathode of Example I was replaced with a p-type silicon semiconducting electrode. Both electrodes were irradiated as in Example I producing a voltage of about 0.4 volt. The external power source was accordingly reduced to provide only 0.2 volt. As in Example I, bromine was produced at the n-type silicon electrode and hydrogen at the p-type silicon electrode.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A process for producing hydrogen gas from an electrolyte solution in an electrolytic cell, wherein the improvement comprises utilizing a solution of a bromide compound as the electrolyte in conjunction with radiant energy and a semiconducting silicon electrode to at least partially power the electrolytic cell.

2. The process of producing hydrogen gas in an electrolytic cell comprising:
   providing an electrolytic cell enclosure containing a bromide electrolyte solution;
   immersing an n-type semiconducting silicon anode and a p-type semiconducting silicon cathode into the bromide electrolyte solution;
   separating said electrodes by a hydrogen ion permeable membrane also immersed in said bromide electrolyte solution;
   exposing the semiconducting electrodes to radiant energy of proper wavelength and sufficient intensity to cause the evolution of hydrogen gas at the cathode and bromine liquid at the anode.

3. A process of producing hydrogen gas in an electrolytic cell comprising:
   providing an electrolytic cell enclosure containing a hydrogen bromide electrolyte solution;
   placing a platinum electrode and a semiconducting silicon electrode into the hydrogen bromide electrolyte solution, wherein the semiconducting electrode also forms part of the wall of the electrolytic cell enclosure containing the platinum electrode and hydrogen bromide solution;

irradiating the semiconducting electrode from that side of the semiconducting electrode which represents the wall portion of the cell containing the hydrogen bromide solution with radiant energy of proper wavelength and sufficient intensity to result in the evolution of hydrogen gas at the platinum electrode and liquid bromine at the semiconducting electrode.

4. The process of producing hydrogen gas in an electrolytic cell comprising:

providing an electrolytic cell enclosure containing a bromide electrolyte solution;

placing a platinum electrode and a semiconducting silicon electrode in the bromide electrolyte solution;

subjecting the semiconductor electrode to a radiant energy source of proper wavelength and sufficient intensity to evolve hydrogen gas from the platinum electrode in the space between the two electrodes and liquid bromine into the solution between the area defined by the electrodes.

5. The process of claims 1, 2 or 4 wherein the bromide electrolyte is selected from the group consisting of HBr, NaBr, KBr, LiBr, CsBr, $SrBr_2$ and mixtures thereof.

6. The process of claim 5 wherein the bromide compound is present in an amount of up to about 50% by weight and the solvent is water.

7. The process of claims 1, 2, 3 or 4 wherein the radiant energy is solar energy.

8. The process of claims 1, 2, 3 or 4 wherein the radiant energy is laser radiation.

9. The process of claims 1, 2, 3 or 4 wherein the radiant energy is produced by a light emitting solid state diode.

10. The process of claims 1, 2, 3 or 4 wherein the radiant energy is light of wavelength up to 11,000 Å.

11. The process of claims 1, 2, 3 or 4 wherein the electrolyte is a 48% by weight solution of HBr in water.

12. The process of claims 1, 2, 3 or 4 wherein at least part of the energy necessary to power the cell is provided by an external power source comprising a battery.

* * * * *